(12) United States Patent
Fabre

(10) Patent No.: US 6,182,688 B1
(45) Date of Patent: Feb. 6, 2001

(54) AUTONOMOUS DEVICE FOR LIMITING THE RATE OF FLOW OF A FLUID THROUGH A PIPE, AND FUEL CIRCUIT FOR AN AIRCRAFT COMPRISING SUCH A DEVICE

(75) Inventor: Christian Fabre, Tournefeuille (FR)

(73) Assignee: Aerospatiale Societe Nationale Industrielle, Paris (FR)

( * ) Notice: Under 35 U.S.C. 154(b), the term of this patent shall be extended for 0 days.

(21) Appl. No.: 09/306,570

(22) Filed: May 6, 1999

(30) Foreign Application Priority Data

Jun. 19, 1998 (FR) .................................................. 98 07741

(51) Int. Cl.$^7$ ...................................................... G05D 7/01
(52) U.S. Cl. ........................ 137/503; 137/500; 244/135 R
(58) Field of Search ................................... 137/500, 501, 137/503; 244/135 R

(56) References Cited

U.S. PATENT DOCUMENTS

| | | | |
|---|---|---|---|
| 2,740,604 | * 4/1956 | Swigart et al. | 244/135 R |
| 3,344,805 | * 10/1967 | Wapner | 137/501 X |
| 3,428,080 | 2/1969 | Brown | 137/501 |
| 4,210,171 | 7/1980 | Rikuta | 137/501 |
| 4,250,915 | * 2/1981 | Rikuta | 137/501 |
| 4,278,010 | * 7/1981 | Wallischeck et al. | 91/420 |

FOREIGN PATENT DOCUMENTS

| | | |
|---|---|---|
| 319675 | 8/1978 | (AT) . |
| 4316484 | 11/1994 | (DE) . |
| 0751448 | 1/1997 | (EP) . |

* cited by examiner

Primary Examiner—Stephen M. Hepperle
(74) Attorney, Agent, or Firm—Stevens, Davis, Miller & Mosher, L.L.P.

(57) ABSTRACT

A device for limiting the flow rate of a fluid through a conduit operates autonomously without any external energy source, and independently of the level of pressure upstream, by operating on an imposed upstream-downstream pressure difference. The flow limiter is capable of limiting the rate of flow of a fluid through a pipe, the flow rate of the fluid depending on the cross section for passage of the fluid in the pipe, and on the difference between the upstream and downstream pressures relative to the passage cross section, in the direction in which the fluid flows. The flow limiter includes means (12, 19) of regulating passage cross section (S), deformable means (13), rigidly connected to the regulating means (12, 19) and subjected, on one side, to upstream pressure (P1) and, on the other side, to downstream pressure (P2), and means (15, 16, 17, 18) capable of defining, for a predetermined difference between upstream and downstream pressures, a position of equilibrium for the regulating means (12, 19) and the deformable means (13). The flow limiter is easy to regulate and, because it contains only a small number of parts, it is characterized by high operational reliability, low mass, and relatively compact size.

7 Claims, 4 Drawing Sheets

AUTONOMOUS DEVICE FOR LIMITING THE RATE OF FLOW OF A FLUID THROUGH A PIPE, AND FUEL CIRCUIT FOR AN AIRCRAFT COMPRISING SUCH A DEVICE

BACKGROUND OF THE INVENTION

1. Field of the Invention

The present invention relates to an autonomous device for limiting the rate of flow of a fluid through a pipe, and to a fuel circuit for an aircraft comprising such a device.

2. Description of Related Art

It is often useful, in many applications, where fluid is flowing through a pipe, to be able to limit the rate of flow of this fluid to a pre-set value.

Devices are known that allow the flow rate of a fluid to be limited, but none of these can be used indiscriminately either with gases or with liquids. Furthermore, such known devices operate in one or other of the following modes:

either in controlled mode, therefore requiring at least one member for measuring physical magnitude (the voltage or current from a flow meter, pressure, in particular) which, associated via a control loop, allows a regulating member (shut-off valve for example) to be controlled;

or in uncontrolled mode, in which case the flow rate is limited by the appropriate dimensioning of limiter members placed directly in the pipe (orifice plate, nozzle, in particular), possibly associated with pressure-reducing devices.

In the case of the controlled mode, operation is not autonomous and remains subordinate to members for measuring a physical magnitude and for providing regulation, which are associated with appropriate processing logic and an external energy source.

In uncontrolled mode, operation is still dependent upon parameters that are liable to change, such as the pressure upstream of the device, for example, and the flow rate can be limited only for a clearly defined maximum upstream pressure.

Thus, none of the known devices can rid itself of all its dependencies on: the nature of the fluid (gaseous or liquid), known values of pressure levels, or an energy supply for powering the flow-limiter members (shut-off member or valve for example).

SUMMARY OF THE INVENTION

Although not exclusively, the present invention is particularly appropriate for limiting the rate of flow of fuel supplied by an aircraft to its engine(s), so as to avoid the phenomenon usually known by the name of "overthrust" that is liable to occur in the event of malfunctioning of the fuel flow regulating systems. This phenomenon, which may arise during the most tricky stages of the flight, particularly on landing (especially final approach and flare-out), may lead to a dangerous situation, as the limit of controllability of the aircraft may be reached.

The object of the present invention is to avoid these drawbacks.

To this end, the autonomous device for limiting the rate of flow of a fluid through a pipe, the flow rate of said fluid depending on the cross section for passage of said fluid in said pipe and on the difference between upstream and downstream pressures relative to said passage cross section, in the direction in which said fluid flows, is noteworthy, according to the invention, in that it comprises:

means of regulating said passage cross section;

deformable means, rigidly connected to said regulating means and subjected, on one side, to said upstream pressure and, on the other side, to said downstream pressure; and means capable of defining, for a predetermined difference between upstream and downstream pressures, a position of equilibrium for said regulating means and said deformable means, a variation in the difference between said upstream and downstream pressures leading to a deformation of said deformable means and to an accompanying movement of said regulating means to return the difference between said upstream and downstream pressures to the difference that corresponds to said position of equilibrium.

Thus, the device according to the invention is entirely autonomous without any external supply of energy, it can be used irrespective of the nature of the fluid flowing through the pipe on which it is mounted, and its operation depends only on the set, value of the difference between the upstream and downstream pressures, which value is kept constant between the upstream and downstream end of a clearly defined passage cross section.

As a preference, the means of regulating said passage cross section comprise, in a first chamber of a housing which is subdivided into two chamber parts connected by a first orifice, a shutter, the frustoconical surface of which has a configuration adapted to suit the surface facing it of the edge of said orifice, and said deformable means consist of a flexible diaphragm, anchored to the internal surface of said housing and connected to said frustonical shutter by a rigid stem.

Advantageously, a bypass pipe, connected to an upstream connector end part of said housing, allows a first face of said diaphragm to be subjected to said upstream pressure, the second face of said diaphragm being subjected to said downstream pressure prevailing in said chamber part that lies between said frustonical shutter and said diaphragm.

Furthermore, said means capable of defining said position of equilibrium comprise at least one screw/preloaded-spring assembly intended to act on said diaphragm/frustoconical-shutter/stem assembly.

According to another feature of the invention, said regulating means comprise, in a second chamber of said housing, this chamber being connected to said first chamber and subdivided into two chamber parts connected by a second orifice, a flat shutter facing said second orifice, which is rigidly connected, via a connecting stem and said stem, to said conical shutter.

The present invention also relates to a fuel circuit for an aircraft which, in a wing of this aircraft, has a fuel tank and a pipe leading to an engine, noteworthy in that it comprises a device as previously defined, mounted on said pipe.

Furthermore, in the fuel circuit for an aircraft, in which booster or backing pumps supply said pipe with fuel, this pipe having a low-pressure isolating valve, said device may be mounted upstream of said isolating valve relative to the direction of flow of the fuel toward the engine, or at the stub of said engine and therefore immediately downstream of the isolating valve.

BRIEF DESCRIPTION OF THE DRAWINGS

The figures of the appended drawings will make it easy to understand how the invention may be achieved. In these figures, identical references denote similar elements.

DESCRIPTION OF THE PREFERRED EMBODIMENTS

Figure 1:
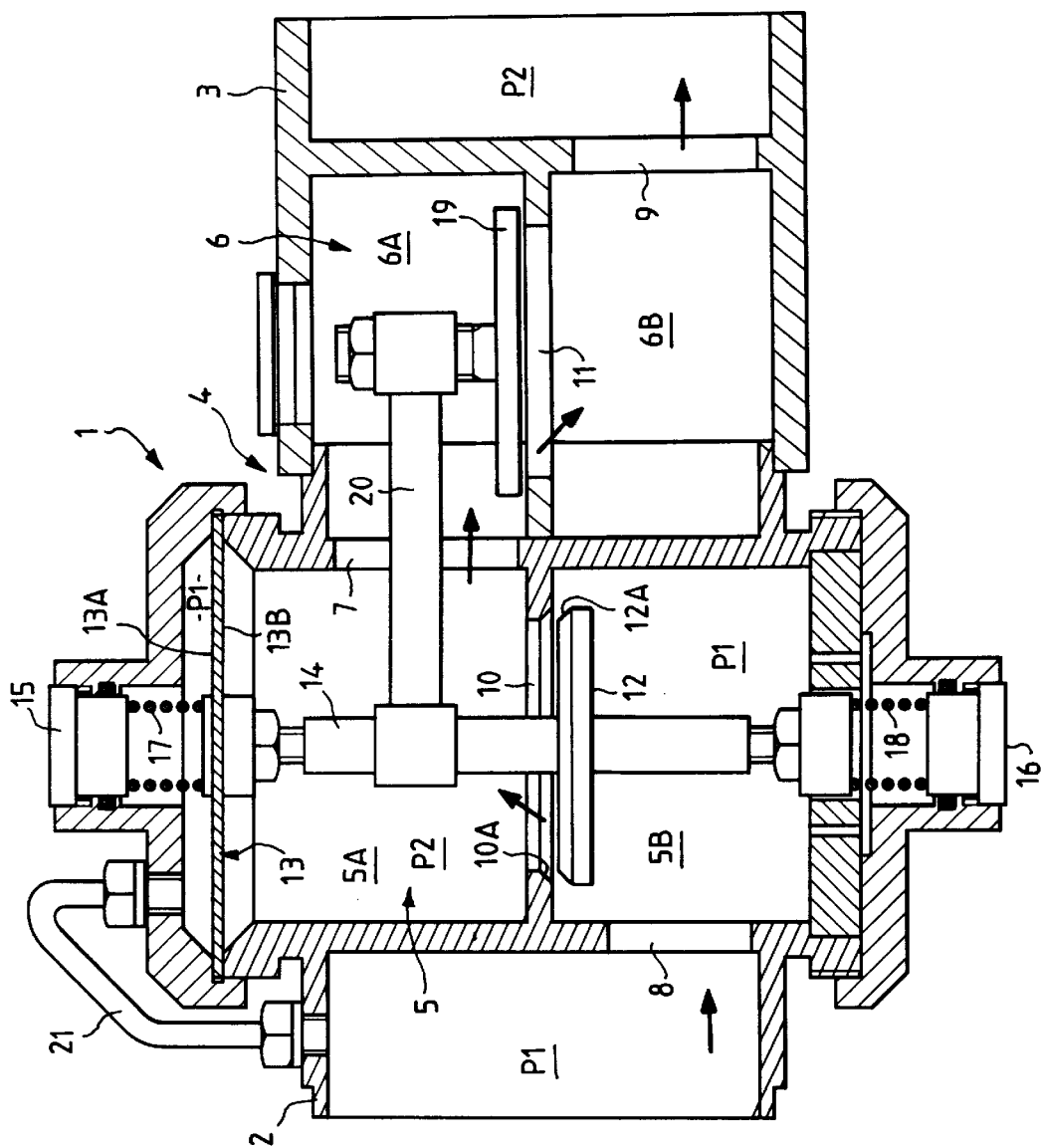
FIG. 1 is a diagrammatic cross section of one embodiment of the device for limiting the rate of flow of a fluid through a pipe.

Referring to FIG. 1, the device 1 for limiting the rate of flow of a fluid is intended to be installed in a pipe (not depicted in FIG. 1) via two connection end parts 2, 3, an upstream one and a downstream one respectively, relative to the direction in which the fluid flows, which is indicated by the arrows in FIG. 1, forming part of a housing 4 in which there are first and second chambers 5, 6, respectively, connected by an orifice 7, and connected to the connection end parts 2, 3 by orifices 8, 9 respectively.

The first chamber 5 is itself subdivided in two chamber parts 5A, 5B, an upper and a lower one respectively, connected by an orifice 10, as is the second chamber 6, the upper 6A and lower 6B parts of which are connected by an orifice 11.

Furthermore, the device 1 comprises, in the chamber part 5B, a shutter or shut-off member 12, the upper frustoconical surface 12A of which has a configuration that corresponds to the lower surface 10A of the edge of the orifice 10 (this shut-off member 12 will hereafter be known by the name of conical shutter). The conical shutter 12 is connected to a flexible diaphragm 13 (anchored to the internal surface of the housing 4) via a rigid stem 14, itself connected to two screws, an upper one 15 and a lower one 16, respectively, each subjected to the action of a compression spring 17, 18. As will be seen in greater detail later, with reference to FIG. 4, the conical shutter 12 makes it possible to increase or decrease the passage cross section of the upstream feed orifice, which has the effect of altering the downstream pressure P2.

Furthermore, the device 1 comprises, in the chamber part 6A, the flat shutter 19 (also known hereafter by the name of flat-bottomed shutter), facing the orifice 11, which is connected rigidly, via a connecting stem 20 and the stem 14, to the conical shutter 12, the opening of one leading to the closure of the other, and vice versa, as will also be seen in greater detail later.

By virtue of the bypass pipe 21 connected to the upstream connector end part 2, the diaphragm 13 is subjected, on its upper face 13A, to the upstream pressure P1. The lower face 13B of the diaphragm 13 is, for its part, subjected to the downstream pressure P2 prevailing in the chamber part 5A.

The conical shutter 12, the stem 14 and the diaphragm 13 constitute an assembly which, on the surfaces under consideration and in the way explained below, is subjected to the pressures P1 and P2 and to the forces (R1 and R2) generated, respectively, by the springs 17 and 18, which forces can be regulated using the respective screws 15 and 16.

The device according to the invention therefore essentially comprises a conical shutter 12 making it possible to reduce or enlarge a cross section for the passage of fluid, which leads to an alteration of greater or lesser significance of the pressure downstream of the device. The shutter 12 is connected to a diaphragm 13 on either side of which the upstream pressure P1 and downstream pressure P2 act, respectively.

The position of equilibrium (diaphragm horizontal) corresponds to an upstream-downstream pressure difference of differential $\Delta P = P1\ P2$ which can be regulated (preloaded springs 17, 18), and the position (which can also be regulated) of the shutter 12 with respect to its seat 10A is then such that the resulting passage cross section, associated with $\Delta P$, governs the maximum flow rate.

Any drop in downstream pressure P2 (which betrays an increase in flow rate demanded by the engine) leads to a loss of equilibrium and to the opening of the shutter 12 to increase the passage cross section and thus re-establish the pressure P2. The opening of the shutter 12 leads to the closure of the shutter 19, the consequence of which is to limit the flow rate during this return-to-equilibrium phase.

Similarly, any increase in downstream pressure P2 leads to the reverse phenomenon.

The device functions irrespective of the level of upstream pressure P1 (provided the mechanical dimensioning is adequate) and is unaffected by (any) reduction or increase in this pressure during operation.

Only the upstream-downstream pressure difference $\Delta P = P1\ P2$ is to be taken into account.

It will also be noted that the device according to the invention, which can be used whether the fluid be a gas or a liquid, is a flow limiter device mounted directly on a pipe conveying a fluid and operating in an entirely autonomous manner without any external energy supply.

Figure 2:
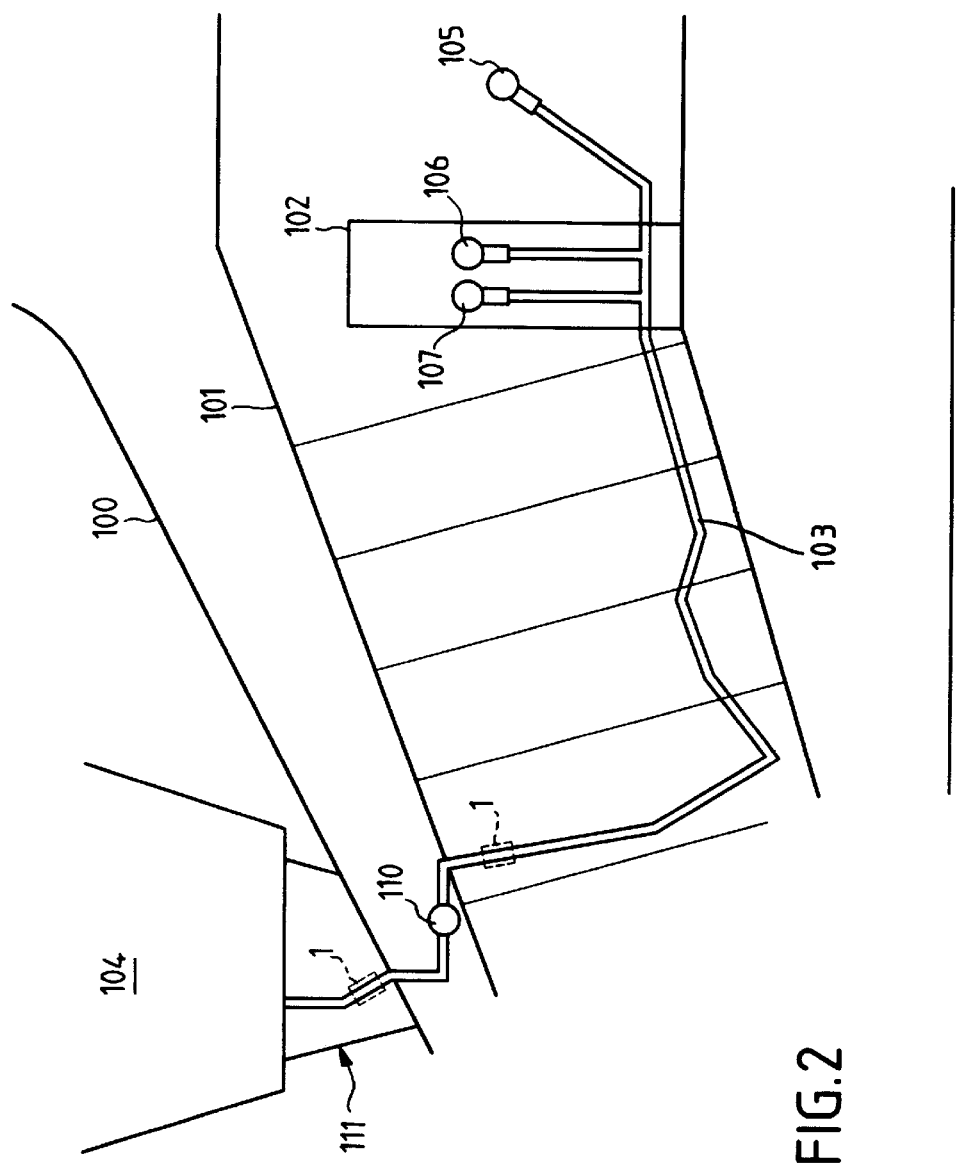
FIG. 2 illustrates diagrammatically, viewed from above, part of the fuel circuit of an aircraft, showing the possible location(s) for the device according to the invention.

FIG. 2 illustrates diagrammatically, in a view from above, part of the fuel circuit of an aircraft in a wing 100 of this aircraft, which wing has a fuel tank 101 comprising a manifold cell 102 and a pipe 103 shown leading to an engine 104.

Figure 3:
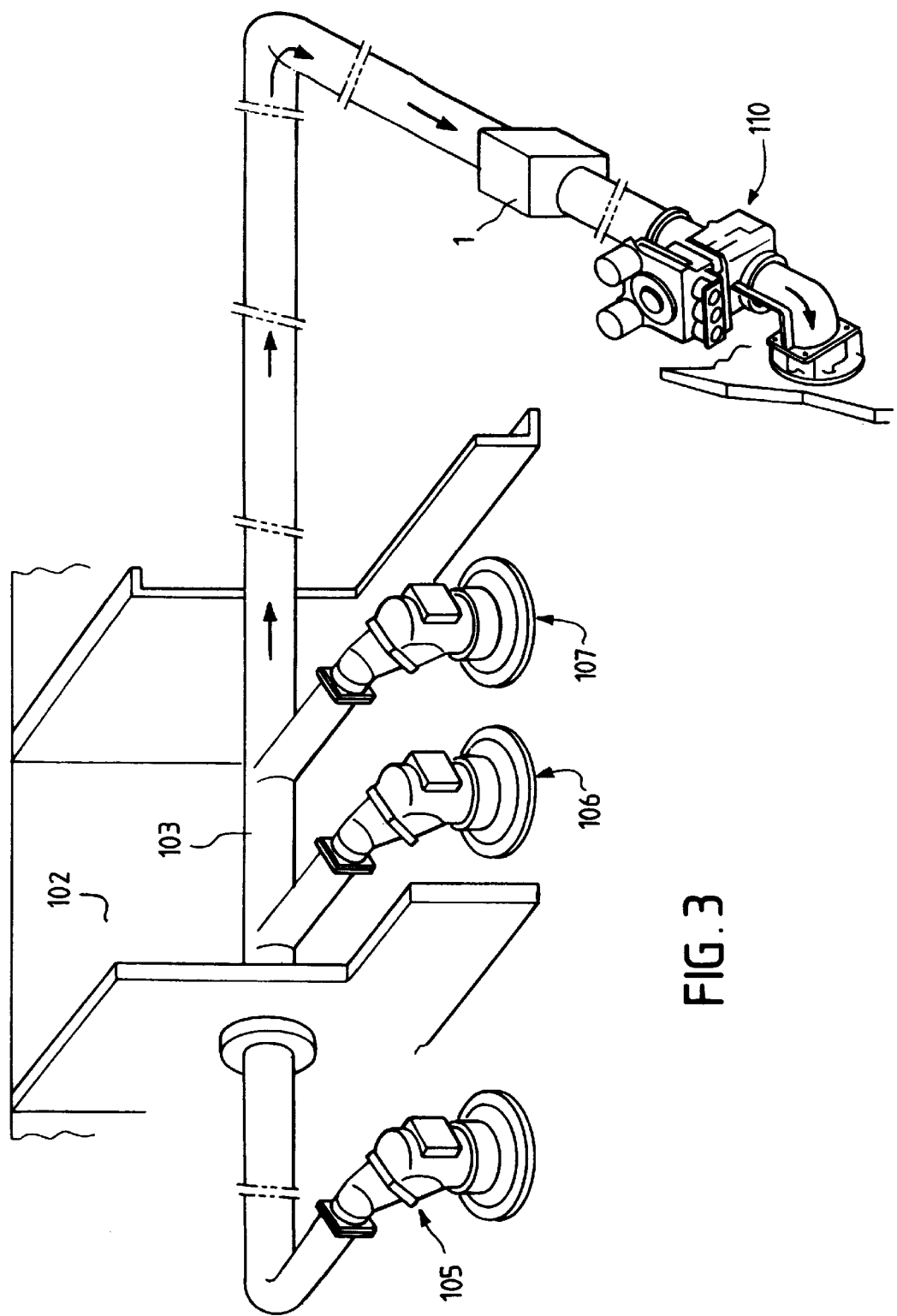
FIG. 3 is a diagrammatic perspective view again showing the essential elements of the circuit of FIG. 2.

Booster or backing pumps 105, 106, 107 supply the pipe 103 with fuel, and this pipe also has, as can be seen better in FIG. 3, a low-pressure isolating valve 110. As shown in FIGS. 2 and 3, the device 1 according to the invention, in this particular application to the supply of fuel to an aircraft engine, may be mounted downstream of the isolating valve 110, relative to the direction in which the fuel flows, which direction is indicated by arrows in FIG. 3 toward the engine 104, or at the stub 111 of the engine 104, immediately downstream of the isolating valve 110, which may be preferred for ease of maintenance reasons.

A good understanding of the operation of the device requires the assembly made up of shut-off member, stem and diaphragm to be brought into mechanical equilibrium, and this is explained below with reference to FIGS. 4 and 5.

Figure 4:
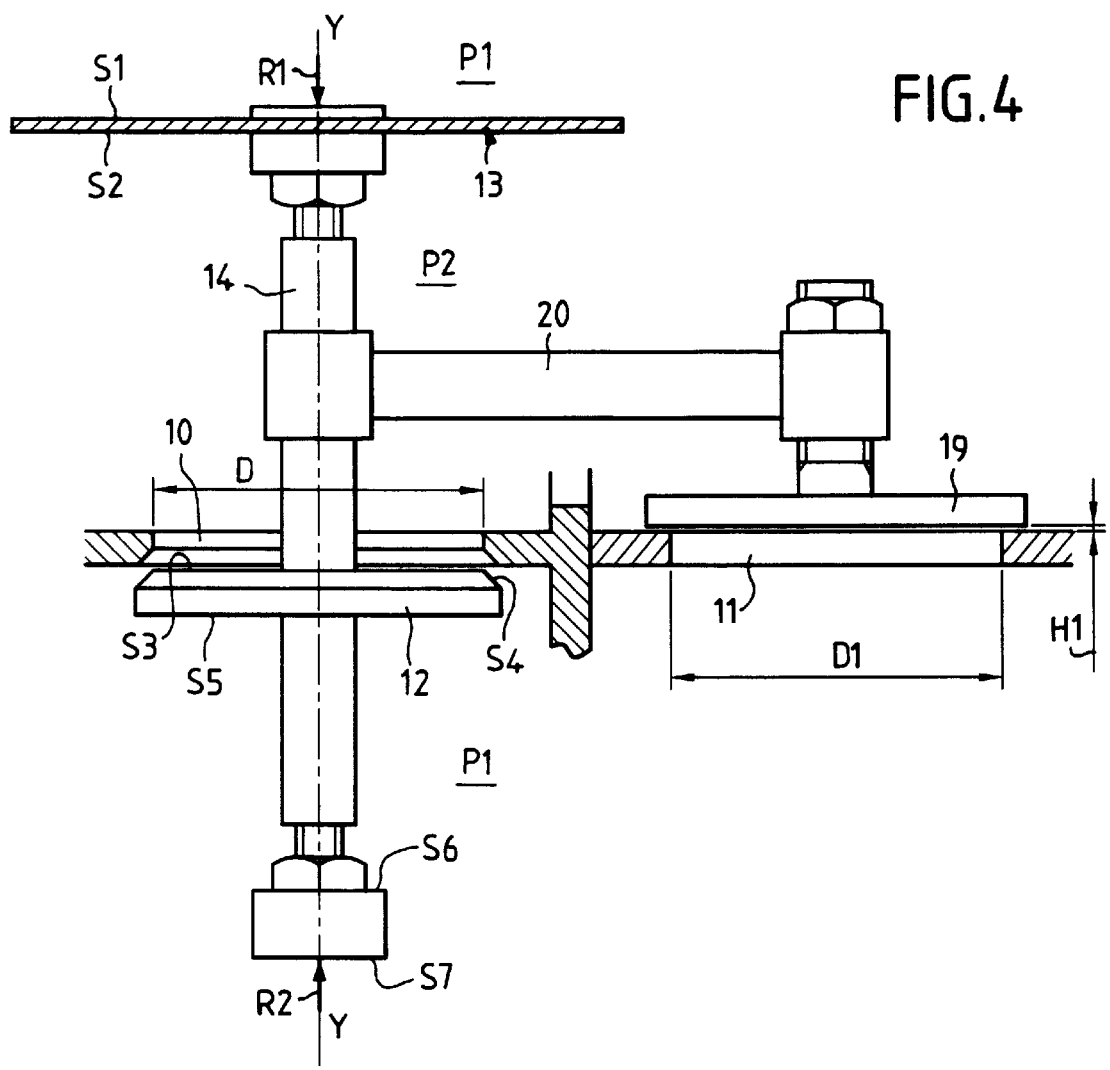
FIG. 4 illustrates the operation of the device according to the invention of FIG. 1.
Figure 5:
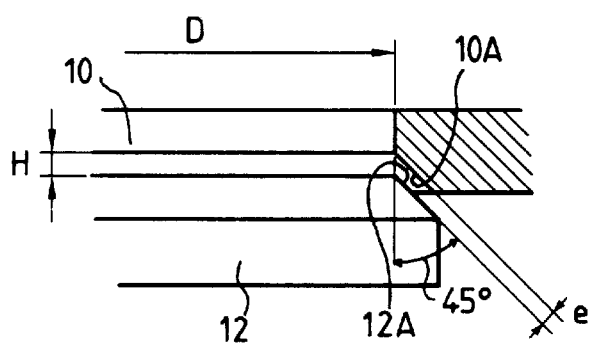
FIG. 5 shows an enlarged detail of FIG. 4.

Projecting the loadings onto the Y—Y axis provides the relationship:

P1.S1+R1+P2.S3+P1.S4.cos(45)+P1.S6=P2.S2+P1.S5+P1.S7+R2 i.e. P1.S1+S4.cos(45)+S6−S5−S7)−P2.(S2−S3)=R2−R1 S1 −S7 denoting the corresponding areas, indicated in FIG. 4.

By setting:
K1=S1+S4.cos(45)+S6−S5−S7
K2=S2−S3,
K1 and K2 being constants, one obtains: K1.P1−K2.P2=R2−R1.

By construction, and with the dimensions given here by way of example, $$K1 = K2 = K$$

i.e. $K(P1-P2) = R2 - R1$.

By regulating the forces R1 and R2 generated by the springs 17 and 18, using the screws 15, 16, a pressure differential $\Delta P = P1 - P2$ may thus be imposed.

The shut-off member 12 is in equilibrium when this pressure differential is exactly satisfied.

The position of the shut-off member 12 with respect to its seat 10A (dimension H) is regulated (screw-nut system) such that the passage cross section is such that, with the pressure differential (P1−P2) under consideration, the flow rate cannot exceed a given value.

Likewise, the flat-bottomed shutter 19 is positioned (dimension H1, screw-nut system also) so that the passage cross section is identical to the one shown above. In "equilibrium" operation, this surface does not play a part in limiting the flow rate.

In the position of equilibrium, the flow rate reaches the maximum desired value, the pressure differential being imposed.

If the downstream pressure P2 decreases, following an increase in fuel demand by the engine (due, for example, to an overthrust phenomenon), the instantaneous flow rate tends to increase because the pressure differential increases. However, as the downstream pressure decreases, equilibrium is lost and the diaphragm 13 flexes downward, opening the conical shutter 12 and closing the flat-bottomed shutter 19, which simultaneously allows the pressure under the diaphragm 13 to increase again and limits the flow rate during the return-to-equilibrium phase.

If, on the other hand, the downstream pressure P2 increases, the instantaneous flow rate tends to decrease because the pressure differential decreases. In a similar way to the previous case, equilibrium is lost, the diaphragm 13 flexes upward, closing the conical shutter 12 and opening the flat-bottomed shutter 19, which allows the pressure under the diaphragm 13 to decrease (by decreasing the supply) and allows return to equilibrium. It will be noted that in this case there is no limitation of flow rate, the flow rate demanded being below the imposed maximum flow rate.

In fact, nominal operation of the system is a constant fluctuation between the two states described above, except when the flow rate demanded by the engine is identical to the maximum flow rate. It will be noted that the movement of the shut-off member is very small and that the phenomenon is continuous.

The numerical example which follows provides a concrete working example for a chosen type of aircraft which seems more particularly exposed to the overthrust phenomenon defined earlier.

The limit on flight quality, that is to say on the controllability of the aircraft (at sea level) in terms of fuel flow rate corresponding to maximum permissible thrust is, for this example, 4.065 kg/s.

The flow rate demanded for take-off thrust and increased by 15% (for aging) (at sea level) is 3.6 kg/s.

For this example, we have chosen to limit the flow rate to Qmax=3.7 kg/s, while the pressure difference has been chosen to be ΔP=P1−P2=0.3 bar (this is an arbitrary choice, it could very well be greater or smaller).

The flow rate through the system can be expressed as follows:

$$Q = b.S\sqrt{2.\rho.\Delta P}$$

where b is a coefficient characterizing the geometry of the system, determined experimentally and here estimated as being equal to 0.8, $\rho=800$ kg/m³ and $\Delta P=0.3$ bar.

The passage cross section S needs to be:

$$S = Q/(b.\sqrt{\sqrt{2.\rho.\Delta P}})$$

i.e. with the above values, $S=6.68\times10^{-4}$ m².

The passage cross section at the conical shutter 12 can be calculated as follows:

$$e = H.\sin(45)$$

ds=2.π.r.e, ds being the elemental surface area (the area of a small cone frustum), r=D/2 and e representing the separation between the frustoconical surface 12A of the shutter and the seat 10A, now e=H.sin(45) and dr=e.cos(45)=H.sin(45).cos(45) hence ds=2.π.r.dr/(cos(45)) i.e.

$$S = (2 \cdot \pi / (\cos(45))) \cdot \int_{r1}^{r2} r \cdot dr$$

with r1=D/2 (D being the diameter of the orifice 10) and r2=D/2+H.sin(45).cos(45), hence $S=\pi.(D.H.\sin(45)+H^2.\sin(45)^2.\cos(45))$.

If, for example, D=53 mm and if a passage cross section of $S=6.68\times10^{-4}$ m² is desired, this corresponds to a shut-off member "lift" H=5.4 mm.

As far as the passage cross section of the flat-bottomed shutter 19 is concerned, S1=π.D1.H1, where D1=D=53 mm, and $S1=S=6.68\times10^{-4}$ m², corresponding to a shut-off member lift H1=4 mm.

The system can be regulated as follows.

We impose, for example, $\Delta P=P1-P2=3\times10^4$ Pa.

In addition, the way in which the device operates is such that: K.(P1−P2)=R2−R1 with, by construction, for example, $K=4.26\times10^{-3}$ m², hence, in this case, R2−R1=12.8 daN.

Ultimately, regulating the system is limited to the following three operations:

a) the conical shutter 12 is positioned in such a way that the position of equilibrium (diaphragm 13 flat) corresponds to a lift H=5.4 mm (regulated using the screw-nut system), b) the flat-bottomed shutter 19 is positioned in such a way that the position of equilibrium (diaphragm 13 flat) corresponds to a lift H1=4 mm (regulated using a screw-nut system), c) screws 15, 16 are used to preload the springs 17, 18 so that the forces generated are such that R2−R1=12.8 daN (as the springs 17, 18 are identical, regulation is performed only on relative travel).

The force exerted by such a spring is proportional to its travel:

$$R1 = Kr.X1$$

$$R2 = Kr.X2$$

$$R2-R1 = Kr.(X2-X1) = 12.8 \text{ daN}.$$

To simplify the demonstration, we shall take: Kr=1.28 daN/mm, a value which is reasonable for springs of this size, namely, for this value, (X2−X1)=10 mm. Choosing for X1 the arbitrary value X1=5 mm, this gives R1=6.4 daN and X2=15 mm, i.e. R2=19.2 daN.

With such a setting, the shut-off member is in equilibrium when $\Delta P=3\times10^4$ Pa and the flow rate is limited to 3.7 kg/s.

Let us assume that, for some reason, the downstream pressure P2 increases, for example by $10^4$ Pa, $\Delta P$ therefore decreases to $2\times10^4$ Pa.

We still have K($\Delta P$)=R2−R1, i.e. R2−R1=8.5 daN, i.e. 4.3 daN less than in the equilibrium position.

As the springs R1 and R2 are identical, the displacements which correspond to 4.3 daN will be split equally between them.

For 4.3 daN, with Kr=1.28 daN/mm, we have X2−X1=3.3 mm, namely 1.65 mm more compression (compared with the position of equilibrium) for the spring R1

$X1$=6.65 mm R1=8.51 daN and 1.65 mm less compression (compared with the position of equilibrium) for the spring R2

$X2$=13.35 mm R2=17.09 daN.

The membrane 13 rises by 1.65 mm, the conical shutter 12 closes, the flat-bottomed shutter 19 opens, and the consequence of this is to decrease the flow rate entering the device, the flow rate leaving being constant (engine demand). The pressure P2 under the diaphragm 13 decreases and there is a return to equilibrium.

Similarly, if we assume that the downstream pressure P2 decreases (excessive demand from the engine) by $10^4$ Pa, $\Delta P$ then increases to $4\times10^4$ Pa.

We still have K($\Delta P$)=R2−R1, i.e. R2−R1=17 daN, i.e. 4.3 daN more than in the equilibrium position.

As the springs R1 and R2 are identical, the displacements which correspond to 4.3 daN will be split equally between them.

For 4.3 daN, with Kr=1.28 daN/mm, we have X2−X1=3.3 mm, namely 1.65 mm less compression (compared with the position of equilibrium) for the spring R1

$X1$=3.35 mm $R1$=4.3 daN and 1.65 mm more compression (compared with the position of equilibrium) for the spring R2

X2=16.65 mm $R2$=21.3 daN.

The diaphragm 13 drops by 1.65 mm, the conical shutter 12 opens, the flat-bottomed shutter 19 closes, and the consequence of this is to increase the flow rate entering the device and therefore increase the pressure under the diaphragm 13 until there is return to the position of equilibrium. During this phase, closure of the flat-bottomed shutter 19 limits the flow rate leaving the device.

It will be noted that, for the simplicity of the demonstration, we have considered variations by $10^4$ Pa (namely about 0.1 bar), but in fact, the shut-off member moves continuously, as soon as there is a departure from the position of equilibrium, and this is what gives it its accuracy.

It should also be noted that the device described hereinabove does not constitute a flow regulator proper but simply a flow limiter. For all logical purposes, its operation is "transparent" as long as the flow rate demanded by the engine remains below the redefined maximum flow rate, which represents the nominal scenario.

Furthermore, the device is made up of a limited number of parts, which are only lightly stressed, and the problems of sealing are limited (in practice, associated only with the diaphragm).

As far as gravity feed (booster pump cut off) is concerned, the system will have to be "bypassed" because of the pressure drop generated by the device and the small (pressure) margin available. In this case, overthrust can only occur if there is a double breakdown (loss of booster pump and a failure of the engine fuel flow regulation system).

Furthermore, the flow limiter device according to the invention is self-cleaning. If, for any reason, the passage cross section at the conical shutter becomes blocked, the pressure under the diaphragm decreases, which causes said shutter to open wider. Similarly, if the flat-bottomed shutter becomes blocked, the pressure under the diaphragm increases, which causes the conical shutter to close and causes the flat-bottomed shutter to open wider.

To sum up, the device according to the invention has the following features and advantages.

It is a flow-limiter device that can be used for fluids in the gaseous or in the liquid state. This device operates autonomously without any external energy source, independently of the level of pressure upstream, by operating on an (imposed) upstream-downstream pressure difference. Furthermore, it is easy to regulate and, because it contains only a small number of parts, its operational reliability is high while at the same time having a low mass and limited size.

In any event, the device according to the invention, in the aeronautical application, limits the rate of flow of fuel to a level such that the resulting maximum thrust in the event of overthrust does not exceed an acceptable limiting value.

The device according to the invention therefore:

allows autonomous operation without any external supply of energy (mechanical system);

limits the rate of flow of fuel (in the case of the aeronautical application) to, at most, the flow rate level that corresponds to the maximum permissible thrust;

allows the flow rate demanded for take-off thrust increased by 15% (ageing) "at sea level" to be supplied, when the booster pumps are in operation;

does not act as a point where debris has an increased likelihood of accumulating;

can be tested periodically and with ease.

What is claimed is:

1. An autonomous device for limiting the rate of flow of a fluid through a pipe, the flow rate of said fluid depending on the cross section for passage of said fluid in said pipe and on the difference between upstream and downstream pressures relative to said passage cross section, in the direction in which said fluid flows, said device comprising:

regulating means for regulating said passage cross section, said regulating means comprising, in a first chamber of a housing which is subdivided into two chamber parts connected by a first orifice, a shutter having a frustoconical surface which has a configuration adapted to suit the surface of an edge of said orifice which is facing said frustoconical surface;

deformable means, rigidly connected to said regulating means and subjected, on one side, to said upstream pressure and, on the other side, to said downstream pressure, said deformable means consisting of a flexible diaphragm anchored to the internal surface of said housing and connected to said frustoconical shutter by a rigid stem; and means capable of defining, for a predetermined difference between upstream and downstream pressures, a position of equilibrium for said regulating means and said deformable means, a variation in the difference between said upstream and downstream pressures leading to a deformation of said deformable means and to an accompanying movement of said regulating means to return the difference between said upstream and downstream pressures to the difference that corresponds to said position of equilibrium.

2. A device as claimed in claim 1, wherein a bypass pipe, connected to an upstream connector end part of said housing, allows a first face of said diaphragm to be subjected to said upstream pressure, the second face of said diaphragm being subjected to said downstream pressure prevailing in said chamber part that lies between said frustoconical shutter and said diaphragm.

3. A device as claimed in claim 1, wherein said means capable of defining said position of equilibrium comprise at least one screw/preloaded-spring assembly intended to act on said diaphragm-/frustoconical-shutter-/stem-assembly.

4. A device as claimed in claim 1, wherein said regulating means comprise, in a second chamber of said housing, this chamber being connected to said first chamber and subdivided into two chamber parts connected by a second orifice, a flat shutter facing said second orifice, which is rigidly connected, via a connecting stem and said stem, to said conical shutter.

5. A fuel circuit for an aircraft which, in a wing of this aircraft, has a fuel tank and a pipe leading to an engine, which comprises a device as claimed in claim 1, mounted on said pipe.

6. A fuel circuit for an aircraft as claimed in claim 5, in which booster or backing pumps supply said pipe with fuel, this pipe having a low-pressure isolating valve, wherein said device is mounted upstream of said isolating valve relative to the direction of flow of the fuel toward the engine.

7. A fuel circuit for an aircraft as claimed in claim 5, in which booster or backing pumps supply said pipe with fuel, this pipe having a low-pressure isolating valve, wherein said device is mounted at the stub of said engine and therefore immediately downstream of said isolating valve.

* * * * *